United States Patent [19]

Leondaridis et al.

[11] Patent Number: 5,063,035

[45] Date of Patent: Nov. 5, 1991

[54] ENHANCED PERFORMANCE OF ALUMINA FOR THE REMOVAL OF LOW-LEVEL FLUORINE FROM GAS STREAMS

[75] Inventors: Paul S. Leondaridis, Paris, France; William A. Von Drasek, Burbank; Gregory M. Jursich, Clarendon Hills, both of Ill.

[73] Assignee: American Air Liquide, New York, N.Y.

[21] Appl. No.: 512,410

[22] Filed: Apr. 23, 1990

[51] Int. Cl.$^5$ .......................... C01B 7/20; B01D 53/34
[52] U.S. Cl. ......................................... 423/241; 55/71; 423/240
[58] Field of Search .................... 423/241, 240; 55/71; 436/167, 134

[56] References Cited

U.S. PATENT DOCUMENTS 3,760,565 9/1973 Fish ..................................... 423/241
3,852,406 12/1974 Krauss et al. ...................... 423/241
4,036,940 7/1977 McLane et al. ........................ 55/71

FOREIGN PATENT DOCUMENTS 7370 1/1977 Japan ................................... 423/240

Primary Examiner—Michael L. Lewis
Assistant Examiner—Brian M. Bolam
Attorney, Agent, or Firm—Oblon, Spivak, McClelland, Maier & Neustadt

[57] ABSTRACT

Low-level fluorine concentrations are removed from gases by conducting a gas stream containing fluorine over an alumina treated with chromium oxide material, thereby effectively eliminating fluorine from the gas while preventing the formation of toxic oxygen difluoride by-product.

7 Claims, 2 Drawing Sheets

ENHANCED PERFORMANCE OF ALUMINA FOR THE REMOVAL OF LOW-LEVEL FLUORINE FROM GAS STREAMS

BACKGROUND OF THE INVENTION

1. Field of the Invention

The present invention relates to a method of removing low concentration level fluorine from a gas.

2. Description of the Background

Alumina, caustic soda and soda lime are commonly used as agents for the removal of low concentration levels of fluorine from gas streams by a gas-solid reaction. For many years, removal of toxic fluorine from gas streams has been important in many industrial applications such as aluminum electrolysis furnaces, plastic fluorination processes and production of metal fluoride compounds. More recently, the increasing demand of excimer lasers in industry has led to an increased demand for the proper disposal of spent excimer gases. In some cases, spent excimer gas mixtures contain fluorine which must be removed from exhaust gas below its threshold limiting value. Typically, the venting of spent excimer gases occurs at sufficiently fast flow rates so that the space-time value in conventionally sized scrubber units is of the order of a few seconds or less. Analyses of the gaseous product resulting from this treatment, however, have shown that the removal of the low levels of fluorine can be accompanied by the formation of oxygen difluoride ($OF_2$) in not insignificant amounts in the gas stream, in particular, when an alumina or soda-lime scrubber is used for this purpose at ambient temperature and at space-time values ranging from 0.5–3 sec, $OF_2$ is generated as an intermediate product prior to the saturation end point where scrubber material loses its reactivity to fluorine. $OF_2$ formation can be as high as one-third of the initial amount of fluorine under these conditions. This is a significant problem of fluorine containing exhaust streams in light of the realization that oxygen difluoride is even more toxic than fluorine. The threshold limit value (TLV) of $OF_2$ is 50 ppb/v, whereas the (TLV) of $F_2$ is 1 ppm/V depending on the reference. Further, the generation of $OF_2$ in a scrubber reduces the operating lifetime of the alumina scrubber. A need therefore continues to exist for an effective means of eliminating low level concentration of fluorine from gas streams under short space-time gas flow and ambient temperatures while effectively preventing the formation of toxic $OF_2$ by-product.

SUMMARY OF THE INVENTION

Accordingly, one object of the present invention is to provide a method of effectively removing low level concentrations of fluorine from a gas over a solid scrubber while effectively eliminating the production of toxic oxygen difluoride by-product.

Briefly, this object and other objects of the invention as hereinafter will become more readily apparent can be attained by a method of removing fluorine from gases containing the same by treating alumina with a chromium oxide material, and then conducting a gas stream containing fluorine over said alumina treated with chromium oxide material, thereby effectively eliminating fluorine from the gas while preventing the formation of toxic oxygen difluoride by-product.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1B:
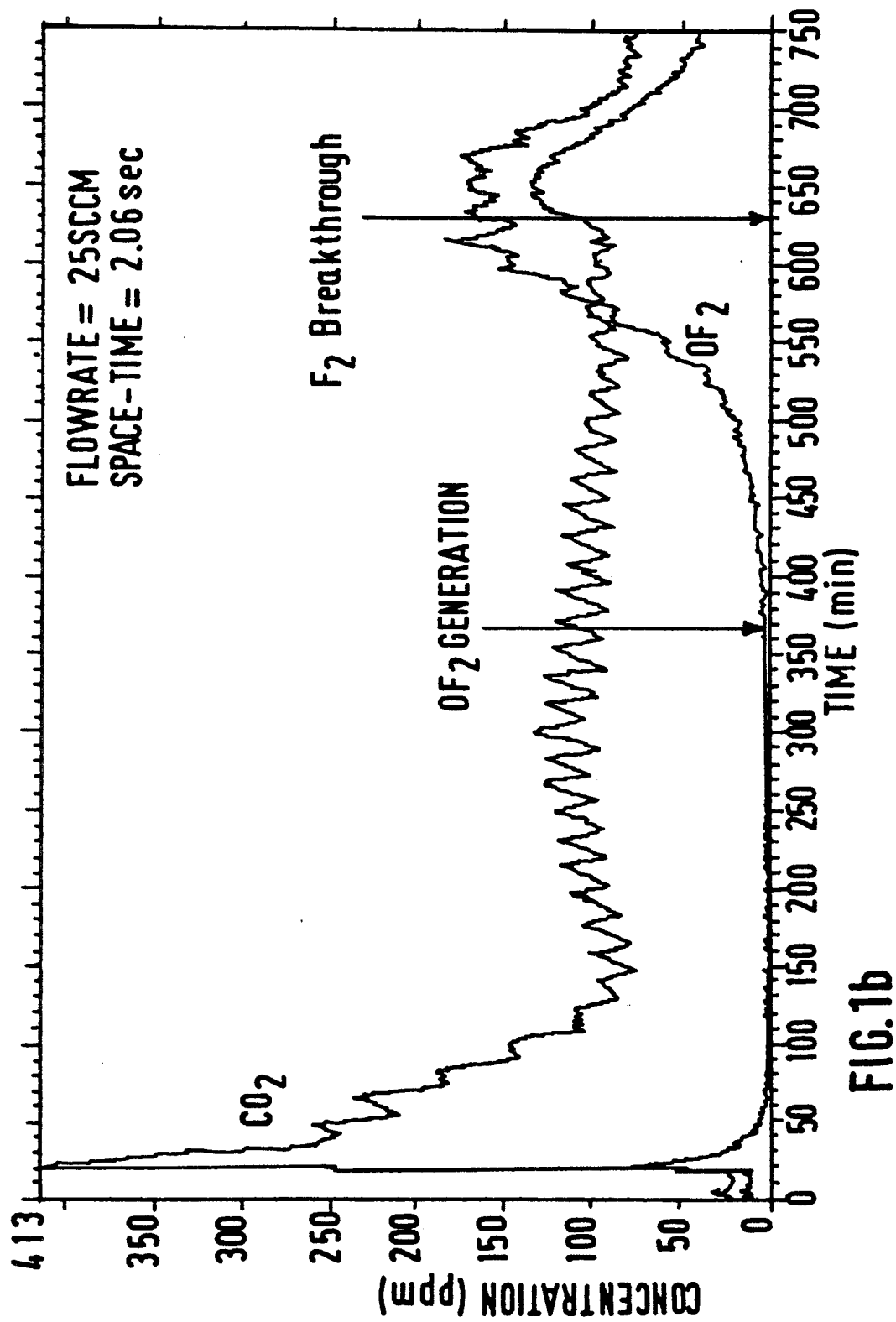
FIG. 1b is a graph which shows the concentration of $CO_2$ and $OF_2$ in a gas versus time which has been scrubbed with the treated alumina scrubber of the invention.

The discovery of the present invention is that when an alumina used for the scrubbing of fluorine from gases containing the same is treated with chromium oxide material, an effective alumina material for the scrubbing of gases containing fluorine is obtained while at the same time effectively preventing the formation of toxic oxygen difluoride by-product.

In order to prepare the chromium oxide modified alumina scrubbing agent of the present invention, an alumina starting material preferably in the form of beads, is treated by soaking in a chromium oxide containing solution. Any soluble chromate or dichromate salt can be employed such as an ammonium or alkali metal chromate or dichromate. Suitable examples include sodium dichromate, potassium dichromate, $CrO_3$, and the like. After soaking of the alumina beads in the solution until an effective amount of the chromate or dichromate is absorbed, the beads are separated from the solution and dried in air with heating. This treatment changes the initial white color of the beads to light yellow. The treated beads are then allowed to cool. The solution in which the beads are soaked preferably contains about 2–10% chromate or dichromate ion. The temperature at which the alumina is soaked is not critical, but normally is room temperature. The amount of chromate or dichromate ion absorbed by the alumina is not critical. Further either anhydrous or hydrated alumina starting material can be employed.

In treating a fluorine containing gas by the method of the present invention, a quantity of treated alumina is placed in a reactor which is usually cylindrical. Normally, the amount of treated alumina, having a particle size ranging from 180–210 μm employed ranges from 0.45 to 0.6 gm, although the amount is not critical and normally depends on the volume of gas to be treated.

The flow rate of fluorine containing gas through the reactor over the scrubber usually ranges from 10 sccm to 100 sccm, preferably 0.5 to 10 sec in space time values. (Space time = the volume of alumina scrubber material/volumetric flow rate of fluorine containing gas.) Contact of the gas with the scrubber occurs at an ambient temperature ranging from 20° C. to 30° C., preferably 20° to 25° C. at ambient pressure. However, heating the reactor improves the scrubbing ability of the material.

A unique aspect of the technique of the present invention is that as the fluorine containing gas flows through the reactor containing the scrubber resulting in the removal of fluorine, the color of the alumina scrubber changes from yellow to dark yellow to brown. This color change thereby provides a convenient colorimetric indication of how much active material for the removal of fluorine remains in the scrubber and therefore is a direct indicator of when a cartridge containing the spent scrubbing agent should be replaced.

Having generally described this invention, a further understanding can be obtained by reference to certain specific examples which are provided herein for purposes of illustration only and are not intended to be limiting unless otherwise specified.

EXAMPLE 1

Chemical treatment of the alumina is performed by soaking alumina beads of about 1–3 mm in diameter in an aqueous solution containing 5% by weight dichromate ion. The solution is prepared by dissolving $Na_2Cr_2O_7 \cdot 2H_2O$ in water preferably for 1–2 days. Afterwards, the treated alumina is dried by heating in an open plate overnight, then again in an oven for 4–5 hours at 250° C. As a result of this treatment, the alumina beads change colour from their initial white color to light yellow. After cooling to ambient temperature the treated alumina material is ready for use.

EXAMPLE 2

Scrubbing of Fluorine-Containing Gas

The performance of the present fluorine scrubber is evaluated for the treatment of dilute fluorine concentrations of 0.05–2% under ambient temperature, atmospheric pressure conditions and sufficient gas flow rates to maintain space-time values of a few seconds or less. Gas mixtures are analyzed before and after exposure to the fluorine scrubber by mass spectroscopy. To assess the capacity of a scrubber material, the gas mixture is allowed to continuously flow through a small cylindrical reactor containing treated alumina until $F_2$ or $OF_2$ is observed.

Figure 1A:
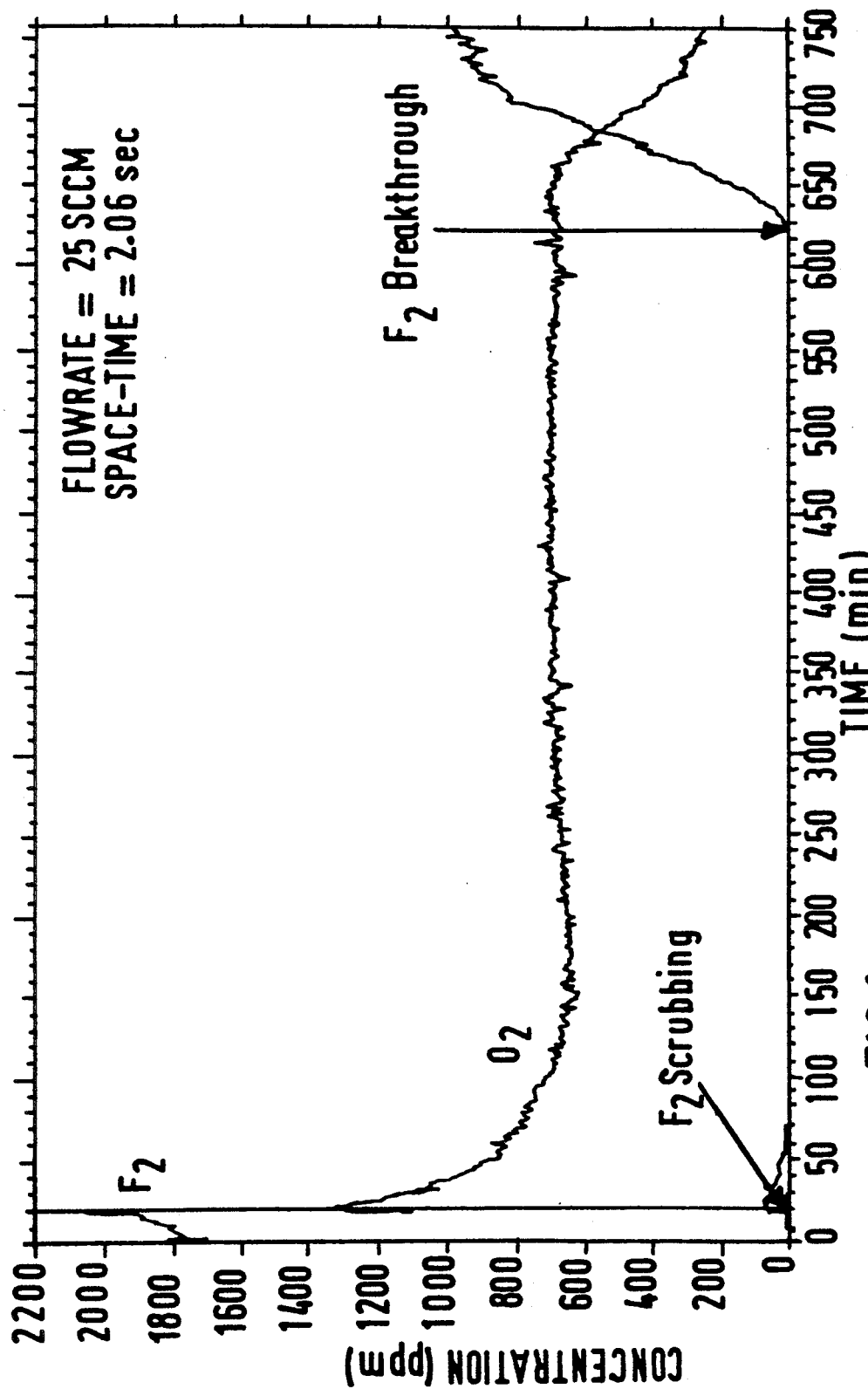
FIG. 1a is a graph which shows the concentration of oxygen and fluorine in a gas versus time which has been scrubbed with the treated alumina scrubber of the invention.

Typical data for the chromium oxide treated alumina are shown in FIGS. 1a and 1b. In this case, a 2250 ppm $F_2$ mixture in Ne is allowed to continuously flow across the inlet of a mass spectrometer. In a time of 0–20 minutes into the experiment the gas is sampled before the scrubber unit under test. The only toxic substance present is $F_2$. After this initial 20 minute period, the gas is sampled after passing through about 0.5 gms of scrubber material housed in a small cylindrical stainless steel reactor. For the next several hundred minutes of the test the fluorine content drops below the detection limit of the mass spectrometer (10 ppm) and large amounts of oxygen appear (~600–1200 ppm). This observation results from chemical reaction between $F_2$ and the scrubber material. The $F_2$ is not observed until some 600 minutes later as shown in FIG. 1a. FIG. 1b shows that $OF_2$ is not generated for the first 350 minutes of gas passage through the scrubber material. Thus the useful lifetime of this given amount of scrubber material is 350 minutes and the observed capacity of this material from this test corresponds to 16 scc of $F_2$ per 0.5 gm of scrubber material.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the U.S. is:

1. A method of removing fluorine from gas streams, consisting essentially of:
    conducting a gas stream containing fluorine over an alumina having chromium oxide absorbed thereon thereby effectively eliminating fluorine from the gas while substantially preventing the formation of toxic oxygen difluoride by-product.

2. The method of claim 1, wherein an alumina starting material is treated with from 2 to 10% of a chromium oxide containing solution to prepare said chromium oxide treated alumina.

3. The method of claim 2, wherein said chromium oxide material is $Na_2Cr_2O_7$, $K_2Cr_2O_7$, or $CrO_3$.

4. The method of claim 1, wherein the flow rate of gas over said treated alumina ranges from 20 sccm to 80 sccm per gram of alumina.

5. The method of claim 1, wherein said gas containing fluorine is a waste gas obtained from the fluorination of plastics, of aluminum, or from the manufacture or the production of inorganic fluoride compounds or excimer lasers.

6. The method of claim 1, wherein the fluorine containing gas is treated over alumina containing chromium oxide at ambient temperature from 20 to 25° C.

7. The method of claim 1, wherein the chromium oxide treated alumina provides a visual colorimetric indication of the effectiveness of the material for removing fluorine as the material changes color with the passage of time as fluorine is removed from said gas stream.

* * * * *